Oct. 7, 1958     C. E. GALLAGHER     2,855,557
SELF-TRIMMING DEVICE FOR AUTOMATIC PILOTS FOR ADJUSTING
CONTROL IN ACCORDANCE WITH CHANGE OF LOAD
Filed Feb. 4, 1953
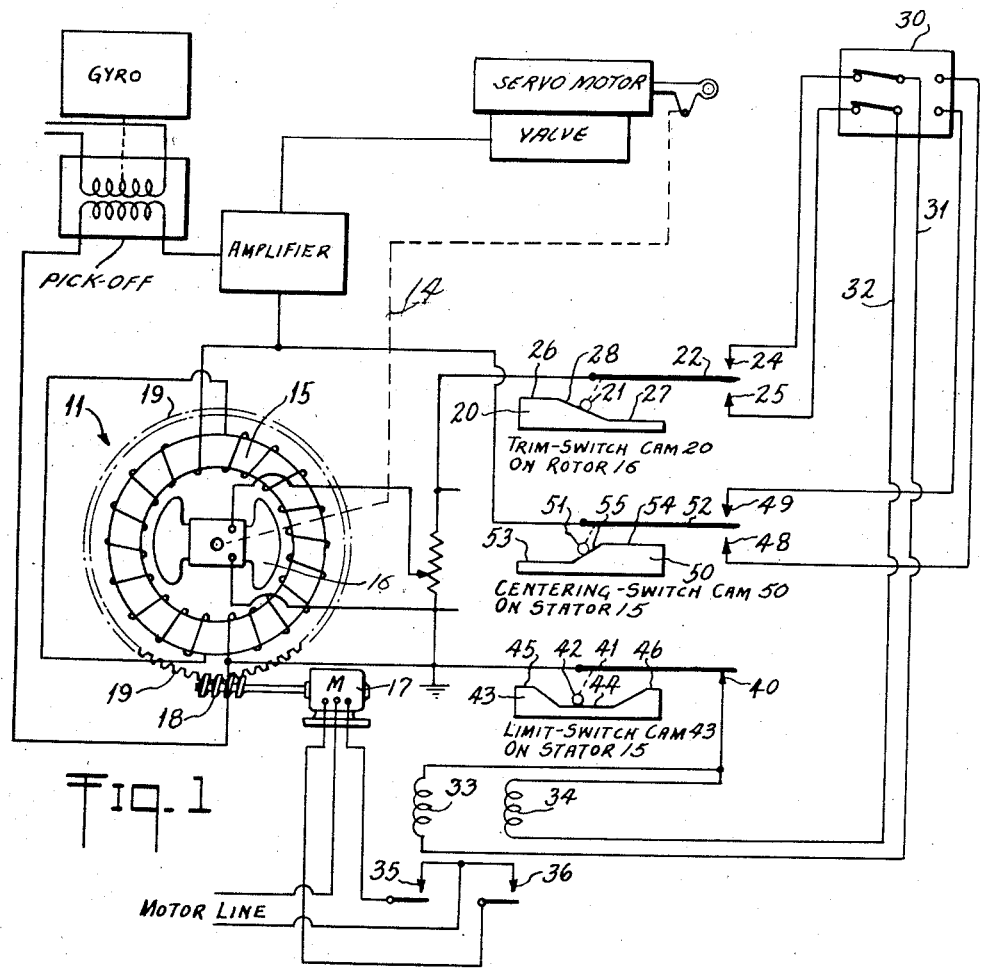
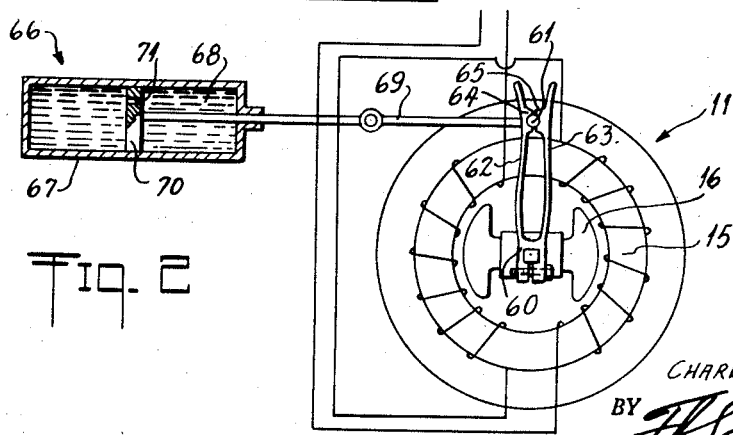
INVENTOR.
CHARLES E. GALLAGHER
BY
HIS ATTORNEYS 2,855,557

SELF-TRIMMING DEVICE FOR AUTOMATIC PILOTS FOR ADJUSTING CONTROL IN ACCORDANCE WITH CHANGE OF LOAD

Charles E. Gallagher, Doylestown, Pa.

Application February 4, 1953, Serial No. 335,180

10 Claims. (Cl. 318—489)

(Granted under Title 35, U. S. Code (1952), sec. 266)

The invention described herein may be manufactured and used by or for the Government of the United States of America for governmental purposes without the payment of any royalties thereon or therefor.

The present invention pertains to the art of automatic pilots, usually termed auto-pilots, for aircraft or the like vehicles, and it provides automatic means for compensating an autopilot installation for transient variations in control surface loading conditions of an aircraft, and hence comprises an improvement over prior-art auto-pilots in this respect.

By means of the invention certain errors of trimming are avoided, these errors being inherent in prior-art auto-pilots. The term "trim" as applied to an auto-pilot in this description is not to be confused with its general usage in which it refers directly either to adjusting or setting the control surfaces of an aircraft in positions other than their normal neutral positions to maintain a desired attitude of flight or to adjusting the trim tabs customarily provided in association with the various control surfaces for the same purpose, in order to achieve stability of an aircraft about various reference axes under diverse operating conditions. As used herein, the term "trim" also denotes corresponding adjustment of the auto-pilot in response to requirements for modified neutral positions of the control surfaces to insure aircraft stability, that is, altering the relationship between electrical components of the auto-pilot and the associated elements of the aircraft control system so as to present a modified zero signal position to maintain a given attitude of the aircraft automatically under variable ambient conditions with a minimum of oscillation of control surfaces.

The invention is applicable to all known auto-pilots, including rate types as well as displacement types. The practical embodiment of the disclosure in the present application is a modification of the auto-pilot structure in the patent to Hansen et al., No. 2,416,097, 18 February 1947, and that patent is referred to herewith to constitute part of the present disclosure.

Recurrent errors, which occur in the operation of all prior-art automatic pilots, are caused by variations in the load imposed on the control surfaces for example, load changes that result from changes of speed, the magnitude of error becoming critical when the change of load accelerates rapidly. The result of such errors is readily experienced, for example, when an automatically piloted airplane is pushed over into a high-speed dive. As the air-speed increases and the airplane recovers partially from the dive, it develops a yaw angle causing slip, and one wing drops. This is highly undesirable because of the side loads that are developed, and because of the resultant inaccuracies of dive angle, as also for other obvious reasons.

The automatic auto-pilot trim-control of the present invention eliminates the described errors satisfactorily, and does not in any way detract from the normal operation of the auto-pilot as an essential component of the automatic control system for an aircraft.

Under practice of the present invention, with reference to any one, each or several of the synchros of an autopilot, one of the units of the synchro is mounted for its stator to rotate on its axis which is coaxial with the axis of its rotor, instead of being rigidly mounted relative to the aircraft as is conventional in prior-art practice. The stator is driven by a motor, which operates under control of the rotor whenever the rotor is displaced away from its zero or neutral position of the unit, and the motor operates to drive the stator in the direction to re-attain alignment between the stator and rotor of the neutral position of the unit. Rotation of the stator by the motor is controlled to a very slow speed, and thus does not interfere with the higher-speed rotation of the rotor under the follow-up action of the unit produced by the incident control surface being displaced in response to a signal of the pick-off unit. A motor-driven speed of rotation of the stator of approximately 1° per second is satisfactory for the purpose.

An operating auto-pilot in an aircraft in flight, such as the representative system described in detail in the Hansen et al. Patent No. 2,416,097, will cause deviation from course to be corrected. This is done as follows: Let us assume the aircraft is flying under predetermined condition at a predetermined attitude which it is desired to maintain. Upon a deviation from course, as yaw, for example, the rotor of the pick-off device at the gyroscope will turn relatively rapidly with respect to the stator and the new alignment will cause an error signal. This error signal is amplified and causes a hydraulic servo to physically displace the rudder by an amount proportional to the error signal in a direction to restore the aircraft to the predetermined attitude. Meanwhile the rotor of a follow-up synchro is mechanically linked to the rudder and the turning of the rudder has caused the follow-up rotor to be turned with respect to its stator. This causes a signal to be introduced into the circuit tending to restore the rudder to neutral position, because the signals of the pick-off and follow-up are opposed and the diminishing difference signal causes diminished rudder displacement until the rudder is once more restored to neutral position and the respective rotors and stators of the pick-off and of the follow-up are aligned concurrent with return of the aircraft to the desired predetermined attitude. This will allow for maintaining a given attitude under predetermined and substantially unvarying ambient conditions. However, due to variations in load as variations in air speed or to varying external conditions such as wind direction or velocity, a constant or changing error is introduced inasmuch as some trim e. g. rudder trim, is required to maintain the aircraft at the desired attitude. In recognition of the need for compensating for such errors Hansen et al., No. 2,416,097, representative of prior art teachings, discloses two embodiments of manually operable means for effecting such compensation including a manually regulated electrical means 31 illustrated in Fig. 1 for adjustably introducing a differential voltage into the system and thereby effecting incremental angular changes in the relation between the respective rotors of the pick-off and follow-up devices, and the alternative manually adjustable mechanical means 32 also illustrated in Fig. 1 by means of which the stator of the follow-up may be angularly displaced to achieve an equivalent compensating effect. However, such manually adjustable compensating means share a common deficiency in that such devices are only operable in response to manual manipulation by the pilot, generally after he has detected the development of the condition requiring such compensation, thus deferring their compensating effect. In addition, their effectiveness is limited by the promptness and skill with which a pilot operates such a device to compensate for transient changes in ambient conditions.

In contrast to the limited effect of such compensating devices disclosed in the prior art teachings, the present invention automatically accomplishes continuous compensation for transiently varying conditions by permitting the stator of the follow-up to be rotated so that rotor and stator of the follow-up may be aligned to zero voltage condition in a different angular position of both. Thus, a trim may be maintained automatically under varying load conditions and varying external conditions to keep the aircraft at a desired attitude without continual hunting of the system and without manual adjustment of the system by the pilot. The rotation of the stator is retarded for slow action with respect to the time for rudder deviation in response to pick-off signal and follow-up rudder restoring time. Hence, proper stator position may be maintained automatically by the instant invention for the follow-up unit during the time of variant load conditions and variable external forces. A centering switch arrangement included in the instant invention provides for restoring the stator to central position when change from auto-pilot to manual control is effected so that violent action will not occur on again switching to auto-pilot operation. Limit switches are provided to limit the maximum deviation from neutral of the stators of the follow-ups.

Several practical embodiments of the invention are disclosed in the accompanying drawings, in which Fig. 1 is a simplified schematic diagram of one embodiment of the invention, the showing being particularly with reference to the auto-pilot of Patent No. 2,416,097, of which the present is a modification, and Fig. 2 is a simplified schematic diagram of a second embodiment of the invention, also constituting a modification of the auto-pilot of Patent No. 2,416,097.

The device of the present invention is disclosed as it is applied to the follow-up unit of any of the several control surfaces in Patent No. 2,416,097, constituting the ailerons, the elevator and the rudder. Manifestly, the invention is not limited to the specific auto-pilot of the patent, but is applicable to all auto-pilots in general, including the products of other suppliers of auto-pilots, and also including rate types as well as displacement types of auto-pilots. The invention is applicable to any of the several control surfaces, constituting the ailerons, the elevator or the rudder, or to any several or all of them. Also it will be understood that the invention may be embodied in the pick-off unit, as well as in follow-up unit, the latter being specifically disclosed by way of illustration.

In the disclosed embodiment of the invention, the device of Fig. 1 is embodied in the follow-up unit of a synchro, and comprises the synchro-motor, illustrated generally at 11, which corresponds with, and may serve the purpose of, any of the several follow-up units disclosed in the referred to Patent No. 2,416,097. Furthermore, the schematic representation of a mechanical linkage 14, illustrated in Fig. 1, corresponds to the similar mechanical linkages 26, 27, and 28 illustrated in Fig. 1 of Patent No. 2,416,097, interconnecting the respective follow-ups 19 and the respective servomotors 22.

Stator 15 of the follow-up unit 11, instead of being rigidly mounted in fixed position with reference to the aircraft as disclosed in the patent, is rotatable on its axis that is coaxial with that of rotor 16. Motor 17 drives the stator 15, for example through the worm 18 and the worm wheel 19, the latter being rigidly secured to the stator 15 coaxially therewith. Motor 17 is reversible, to drive the worm wheel 19, and the stator 15 to which the worm-wheel is secured, alternatively in opposite directions.

Trim-control cam 20 is keyed or otherwise secured to the follow-up rotor 16, and rotates therewith whenever the rotor is rotated, in either of opposite directions, in response to a signal of the corresponding pick-off unit as described in Patent No. 2,416,097. Cam follower 21 is carried by the contact arm 22, which is actuated by cam 20 alternatively in opposite directions to engage the respective contacts 24 and 25 of the trim control switch of cam 20. Cam 20 comprises thrust contours constituting the rise 26 and the fall 27 for actuating contact arm 22 into engagement with, and to close circuit through, the contacts 24 and 25, respectively. When the follower 21 is on the camming contour constituting the incline 28 between the rise 26 and the fall 27, the contact arm 22 is positioned between the contacts 24 and 25, and out of contact with both.

Switch contacts 24 and 25 are carried by the stator 15 and rotate therewith. Incline 28 is located circumferentially of rotor 16 in position to correspond with rotor 16 and stator 15 being relatively positioned in neutral position of the follow-up unit.

Contacts 24 and 25 are connected to respective contacts of the two-way switch 30, and from the switch through respective lines 31 and 32 to the respective relays 33 and 34. Motor 17 is driven in one direction or the other by one or the other of the respective relay switches 35 or 36 being closed, depending upon which of the respective corresponding relays 33 or 34 is energized by one or the other of the respective switches 24 or 25 being closed. When both switches 24 and 25 are open by the follower 21 being positioned on incline 28, both relay switches 35 and 36 are open, and the motor 17 is not in operation. Rotor 16 then is in zero or neutral position of follow-up unit 11.

Whenever the rotor 16 is rotated in one or the other direction out of zero or neutral position of the follow-up unit 11, coincident rotation of trim-control cam 20 causes the follower 21 to ride away from incline 28 onto either the rise 26 or the fall 27, and a circuit is closed through the corresponding contact 24 or 25. Corresponding relay 33 or 34, respectively, is energized thereby closing corresponding relay switch 35 or 36, and the motor 17 is energized to drive the stator 15, direction of rotation of motor 17 being determined by whichever of the relays 33 or 34 is energized and being the direction that drives the stator towards the position with reference to rotor 16 of zero or neutral position of the follow-up unit 11.

Worm and gear 18 and 19 constitute a retardation device for the drive of stator 15 by motor 17. The gear ratio of worm and gear 18 and 19 limits rotation of the stator 15 to a speed which does not interfere with the higher-speed relative rotation of the follow-up action as described in Patent No. 2,416,097. Approximately 1° per second rotation of the stator 15, under drive of motor 17, has been found satisfactory for practice of the invention.

The described structure, it will be observed, is applicable to any of the airplane control surfaces shown in the patent, constituting the ailerons, the elevator or the rudder, and a like structure may be embodied in the synchro of any one, two or all three of the control surfaces. Whenever a gyro displacement rotates the rotor of the pick-off unit for a given control surface, resulting in rotation of the rotor of the corresponding follow-up unit 11, motor 17 is energized to rotate the stator 15 in the direction towards attaining realignment between the rotor 16 and its stator 15, that is toward the neutral position of the unit. This slow rotation of stator 15, under drive of motor 17, has been shown in actual practice of the invention, and by tests, to eliminate errors satisfactorily that are caused by load variations on the airplane control surface, for example such load variations as occur when the airplane is thrown into a high-speed dive.

The limit-control switch of contact 40 is in circuit with both relays 33 and 34, and is opened or closed by the contact arm 41, which carries the cam follower 42. The contact arm is raised out of, or lowered into, contacting engagement with contact 40 alternatively by operation of the limit-control cam 43, which is keyed to, or otherwise secured to, the stator 15 to rotate therewith. When the follower 42 is in engagement with the camming contour constituting the land 44 of cam 43, the circuit of relays 33 and 34 is closed at contact 40, and motor 17 is energized provided an energizing circuit is closed also at one or the other of the contacts 24 and 25 as hereinbefore described by the rotor 16 being displaced away from neutral position of the follow-up unit 11 in response to a signal of the corresponding pick-off unit.

Land 44 extends over an arc of predetermined extent, and is extended in opposite directions away from a fixed reference of the aircraft, this reference corresponding with the stator 15 being in the fixed position that is disclosed in the embodiment of Patent No. 2,416,097. At respective opposite ends of the land 44 there are thrust contours constituting the inclines sloping upwardly from land 44 to the lands 45 and 46, which are displaced in respective opposite directions away from a point with reference to a fixed datum point of the aircraft which corresponds with the fixed position of the stator disclosed in Patent No. 2,416,097. The arcuate distance between lands 45 and 46, and away from the fixed reference of the aircraft, is determined by the maximum desired departure of stator 15 from its fixed position of the prior art, and lands 45 and 46 are located correspondingly. When stator 15 is rotated by operation of motor 17, and its displacement reaches the magnitude which is the maximum desired displacement of stator 15 away from its fixed position of the prior art, follower 42 rides up one of the inclines that approaches a land 45 or 46 until switch 40 is opened, motor 17 stops, and rotation of stator 15 stops.

The limit-control cam 43 limits the extent of displacement of stator 15 in either of opposite directions, and prevents its displacement during automatic-pilot control away from its prior art fixed position beyond a predetermined maximum desired magnitude.

It is thought to be advisable, when the aircraft is being flown under manual-pilot control, that the stator 15 be located in its normal position that corresponds with its fixed position with reference to the aircraft that is disclosed in Patent No. 2,416,097. The centering-switch including contacts 48 and 49 serves this purpose, and the contacts are connected severally to the second set of terminals of the two-way switch 30, and through the respective lines 31 and 32 are connected with the respective relays 33 and 34 when switch 30 is thrown from the left to the right in Fig. 1. Switch 30 is thrown to the right in Fig. 1 at the time the setting of the auto-pilot of the invention is changed from automatic-pilot to manual-pilot control, and switch 30 is thrown from right to left in Fig. 1 at the time the auto-pilot is set for automatic-pilot control.

Centering cam 50 is keyed, or otherwise secured, to stator 15, and rotates therewith. Follower 51 is carried by contact arm 52, which is actuated into engagement with switch contact 48 whenever the follower rides along the camming contour constituting the lower land 53, contact arm 52 being actuated into engagement with the switch contact 49 whenever the follower 51 rides along the camming contour constituting the upper land 54. The camming contour of incline 55 is between the lower and upper lands 53 and 54, and is located circumferentially with reference to the stator 15 in the position that corresponds with the stator occupying its normal position, that is its fixed position disclosed in Patent No. 2,416,097.

Centering-control cam 50 serves as an auxiliary control to be operated only when the auto-pilot is set for manual-pilot control. At the time when the auto-pilot is reset to manual-pilot control, motor 17 may be operating in response to displacement of rotor 16 by signal of the pick-off unit to drive stator 15 in the direction towards re-attaining the neutral position of the follow-up unit 11, and the cam follower 51 may be, and usually is, on one or the other of the respective lower and upper lands 53 or 54 of centering-control cam 50. If contact 48 happens to be closed, by follower 51 being on lower land 53 at the time two-way switch 30 is thrown to the right in Fig. 1, relay 33 will become energized to cause motor 17 to operate in the direction for follower 51 to travel towards incline 55. Similarly, if contact 49 happens to be closed by follower 51 being on land 54, relay 34 will be energized to cause motor 17 to operate in the direction for follower 51 to travel towards incline 55.

Whenever the follower 51 rides onto the incline 55, either from the lower land 53 or from the upper land 54, the contact arm 52 disengages whichever of the respective switch contacts 48 or 49 it happens to be in contact with, thereby deenergizing the corresponding relay 33 or 34 respectively. This opens whichever of the relay switches 35 or 36 happened to be in closed condition, and the motor 17 stops rotation of stator 15. By means of the described operation, stator 15 is actuated to its normal position with reference to the aircraft which corresponds with its fixed position disclosed in Patent No. 2,416,097, where it remains until the auto-pilot at some later time again is set for automatic-pilot control.

It will be observed that, when switch 30 is closed to the right in Fig. 1, either of the contacts 24 or 25 becoming closed by displacement or rotor 16 away from neutral position of the follow-up unit will have no effect on the system illustrated in Fig. 1. Motor 17 will not be set into operation by displacement of rotor 16 away from its neutral position in response to a signal of the pick-off unit of the synchro. Hence, any of the hereinbefore described errors which are caused by load changes on control surfaces must be corrected by manual-pilot control in the usual prior art manner.

In actual use of the device of the present invention in some applications, it has been found to be of no practical importance whether or not the stator 15 is centered at any time in accordance with its fixed position as disclosed in Patent No. 2,416,097. Therefore, the refinement of the centering switch including contacts 48 and 49 under control of cam 50, may be eliminated. When the centering switch is eliminated, the two-way switch 30 also may be eliminated, the contacts 24 and 25 in this modification being connected directly through respective lines 31 and 32 with the respective relays 33 and 34.

Fig. 2 discloses an alternative second embodiment of the invention, which also is a modification of the auto-pilot of Patent No. 2,416,097.

Bifurcated spring 60, which in the device shown in Fig. 2 constitutes the equivalent of the motor 17 in Fig. 1 and will hereinafter be referred to as the motor in the subsequent discussion of Fig. 2, is keyed or otherwise secured to the rotor 16 of the follow-up unit or synchro-motor 11. When rotor 16 rotates in response to a signal of its pick-off unit, spring 60 rotates with it.

Pin 61 is secured to stator 15, and projects therefrom into position between the resilient tines 62 and 63 of bifurcated spring 60, each of the tines 62 and 63 being provided with a seat, 64 or 65 respectively, in which pin 61 bears and is held for any magnitude of displacement of the rotor 16 with reference to the stator 15. Tines 62 and 63 press against the pin 61 opposed to each other resiliently, and tend to hold the pin 61 in predetermined position circumferentially with reference to the rotor 16 as determined by the opposed pressures of tines 62 and 63 which are balanced, and this position of pin 61, seen in Fig. 2, corresponds with the position of the stator 15 and rotor 16 with reference to each other that is the zero or neutral position of the follow-up 11.

When the rotor 16 is displaced with reference to the stator 15 in response to a signal of the pick-off unit of the synchro, depending upon the direction of displacement, one or the other of the tines 62 or 63 yields resiliently and is tensioned, and thereafter operates as a motor to drive the stator 15 in the direction of displacement of the rotor 16 towards reattaining zero or neutral alignment between the stator and rotor. Thus, operation of the spring 60 as a motor is determined by displacement of rotor 16 with reference to stator 15, and is controlled directly by the rotor 16.

The speed with which the stator 15 is driven alternatively in opposite directions by one or the other of the tines 62 or 63 is controlled by the dash pot 66 which constitutes a retardation device, comprising the cylinder 67 containing liquid 68. Connecting rod 69 connects the pin 61 with piston 70, which travels in the working barrel of cylinder 67 under power from one or the other of the tines 62 and 63 acting as a motor. Bore 71 through piston 70 retards the flow of liquid 68 from one side of piston to the other, and limits the rate of travel of the piston.

When rotor 16 of follow-up 11 is displaced with reference to stator 15 in response to a signal from its pick-off unit in the manner disclosed in Patent No. 2,416,097, the tine 63 is deflected relatively to the right if the displacement is counterclockwise in Fig. 2, and tine 63 is detensioned accordingly. Tine 62 is similarly deflected to the left, and also is tensioned, in the case of clockwise displacement of rotor 16. The tine 63, or alternatively the tine 62, thereupon operates as a motor that rotates the stator 15, respectively counterclockwise or clockwise, actuating the stator 15 in the direction to bring it and rotor 16 back to neutral relationship of zero position of the follow-up 11. Dash pot 66 applies a drag that retards actuation of stator 15 by the tine 62 or the tine 63, and produces a predetermined time delay that is established by the cross-sectional area of bore 71 through piston 70. Bore 71, under practice of the present invention, is constricted to an extent that limits rotation of the stator 15 under the motive force of either tine 62 or 63 approximately to 1° per sec.

The effective operation of the embodiment of Fig. 2 is the same as the embodiment of Fig. 1 as hereinbefore described. It will be seen readily that the length of cylinder 67, and the magnitude of the stroke of piston 70, limits the permissible distance of travel of the piston 70, and thus operates as a limiting stop in both directions which prevents rotation of stator 15 beyond a predetermined desired displacement away from the fixed position of the follow-up stator that is disclosed in Patent No. 2,416,097.

The scope of the present invention is determined by the accompanying claims, as follows.

I claim:

1. In a synchro system including at least one pick-off unit and at least one follow-up unit operatively interconnected, each said unit having a relatively rotatable rotor and a relatively fixed stator disposed adjacent and operatively related thereto, a self-trimming device comprising a driving means including an element mounted upon and rotatable with the rotor of one said unit and hence responsive to angular displacement of the rotor of said one unit from a predetermined position relative to the stator adjacent thereto, said driving means being operable to superimpose rotation of the adjacent stator in the direction of the rotor displacement, and a retardation device incorporated in said driving means for continuously limiting the rotation of the stator by the driving means to a rate substantially less than the rotation of the rotor.

2. In an auto-pilot embodying a synchro comprising a pick-off unit and a follow-up unit, each unit including a relatively rotatable rotor and an operatively related stator disposed concentrically of the adjacent rotor, a self-trimming device comprising a reversible driving means continuously responsive to angular displacement of the rotor of one unit of said synchro relative to the stator of said one unit, said driving means being operable to angularly displace the stator in the direction of displacement of the rotor, and a retardation device incorporated in said driving means for limiting the rate of rotation of the stator of said one unit to a rate substantially less than the rate of rotation of the rotor of said one unit, whereby continuous compensation for transient variations in ambient conditions is effected concurrent with normal operation of auto-pilot.

3. An auto-pilot system embodying a synchro comprising a pick-off unit and a follow-up unit, each unit including a relatively rotatable rotor and a relatively fixed stator disposed adjacent to and concentric of the rotor, a reversible driving means continuously responsive to relative displacement of the rotor of said follow-up unit from a predetermined position relative to the stator of said follow-up unit, said driving means being operable to angularly displace the stator of said follow-up unit in the direction of displacement of the follow-up rotor, and a retardation device incorporated in said driving means for limiting the rotation of the follow-up stator to a rate substantially less than the rate of rotation of the follow-up rotor.

4. In an auto-pilot as defined in claim 3, means for de-energizing said driving means at predetermined extreme angular positions of the follow-up stator to limit rotation of the follow-up stator to a predetermined maximum angular displacement of the stator with reference to an aircraft in which it is mounted, and manually operable means for energizing said driving means in the sense to return the stator to its predetermined position with reference to an aircraft in which it is mounted.

5. In an auto-pilot embodying a synchro comprising at least one pick-off unit and at least one follow-up unit, each unit including a relatively rotatable rotor and a stator disposed concentrically of and operatively related to the adjacent rotor, and the stators of respective pick-off and follow-up units being electrically interconnected in opposed relation so that a means positioned by displacement of the rotor of a pick-off unit and in turn positioning the rotor of the corresponding follow-up unit is controlled by a diminishing difference signal; a continuously acting self-trimming device comprising at least one reversible motor, connecting means for operatively interconnecting each said motor and the stator of a follow-up unit, control means for each said motor continuously operable in response to angular displacement of the rotor of a follow-up unit relative to its adjacent stator to angularly displace the stator in the direction of displacement of said rotor by energizing said motor, and a retardation device incorporated in said connecting means for limiting the rate of rotation of the stator to a rate substantially less than the rate of rotation of the rotor, whereby continuous compensation for transient variations in ambient conditions is effected concurrent with normal operation of an auto-pilot.

6. In an auto-pilot a synchro embodying a pick-up unit and a follow-up unit having a rotor and a stator rotatable on its axis coaxially with the rotor of the follow-up unit, a motor operable to rotate the stator of the follow-up unit, a control for operation of the motor in response to rotation of the rotor out of the neutral position of the follow-up unit, the control operating the motor to rotate the stator towards the neutral position of the follow-up unit, the motor being a reversible electric motor, the control comprising a relay for each direction of operation of the motor and a relay-control switch operating the several relays selectively, a motor-control cam carried by the rotor to rotate therewith and comprising off-set camming contours for operation of each of the several relays through the relay-control switch, the motor control cam additionally comprising an intermediate camming contour disposed between the off-set camming contours for operation of the respective relays and located circumferentially of the rotor in a position corresponding with the neutral position of the follow-up unit.

7. In an auto-pilot as defined in claim 6, a limit-control cam carried by the stator to rotate therewith, the control comprising a relay-control switch under operation of the limit-control cam, the limit-control cam comprising a land for closing its relay-control switch and a thrust contour at each of opposite ends of the land for opening the relay-control switch, the land being located circumferentially of the cam in position corresponding with the normal position of the stator with reference to the aircraft and extending circumferentially in opposite directions predetermined distances that correspond with the maximum desired displacement of the stator in respective opposite directions away from the normal position of the stator with reference to the aircraft.

8. In an auto-pilot as defined in claim 6, a centering-control cam carried by the stator to rotate therewith, a control switch for the relays operable by the centering-control cam, the centering-control cam comprising a camming contour for operating each of the relays and an intermediate camming contour between the relay operating contours located circumferentially of the stator in position corresponding with the normal position of the stator with reference to the aircraft, a two-way switch, the relay-control switches of the cam carried by the rotor and of the centering-control cam being in the respective alternate circuits of the two-way switch and the relays being in the circuits of the two-way switch common to the circuits of the several cams.

9. In an auto-pilot as defined in claim 3, the driving means comprising a spring tensioned by rotation of a rotor out of the neutral position of the follow-up unit, and the retardation device comprising a motion damping means operatively connected to said spring and arranged to be effective through such operative connection to damp the action of said spring and thereby limit speed of rotation of the stator to a rate substantially less than the speed of rotation of the rotor under normal follow-up action of the auto-pilot synchro.

10. In an auto-pilot as defined in claim 3, the driving means comprising a spring including opposed resilient tines each operable to rotate the stator in one direction in response to rotation of the rotor in that direction and severally tensioned by rotation of the rotor out of the neutral position of the follow-up unit, and a retardation device comprising a dash pot operatively connected to said spring to apply drag in opposite directions to the displacement of respective tines thereof and thereby limiting the speed of rotation of the stator to a rate substantially less than the speed of rotation of the rotor under the follow-up action of the auto-pilot synchro.

References Cited in the file of this patent

UNITED STATES PATENTS

| | | |
|---|---|---|
| 1,462,354 | Pero | July 17, 1923 |
| 2,415,429 | Kellogg et al. | Feb. 11, 1947 |
| 2,416,097 | Hansen et al. | Feb. 18, 1947 |
| 2,419,970 | Roe et al. | May 6, 1947 |
| 2,454,355 | Sunstein | Nov. 23, 1948 |
| 2,471,637 | MacCallum | May 31, 1949 |
| 2,568,719 | Curry | Sept. 25, 1951 |
| 2,595,250 | Harcum | May 6, 1952 |
| 2,618,771 | Stanley et al. | Nov. 18, 1952 |
| 2,627,384 | Esval | Feb. 3, 1953 |
| 2,647,233 | Kutzler | July 28, 1953 |
| 2,654,061 | Gille | Sept. 29, 1953 |
| 2,661,452 | Curry | Dec. 1, 1953 |
| 2,717,132 | Cooper | Sept. 6, 1955 |

OTHER REFERENCES

Servomechanism Fundamentals, Lauer, Lesnick, Matson, McGraw-Hill, N. Y., 1947, page 31.